United States Patent
Monk et al.

(10) Patent No.: US 6,711,766 B2
(45) Date of Patent: Mar. 30, 2004

(54) MULTI-PURPOSE, ARTICULATED, SEGMENTED FIELD PANEL KIT AND FABRICATION PROCESS

(75) Inventors: Russell A. Monk, Salem, OR (US); Michael R. Dennis, Scappoose, OR (US)

(73) Assignee: MJD Innovations, LLC, Scappoose, OR (US)

( * ) Notice: Subject to any disclaimer, the term of this patent is extended or adjusted under 35 U.S.C. 154(b) by 0 days.

(21) Appl. No.: 10/160,371

(22) Filed: May 31, 2002

(65) Prior Publication Data

US 2003/0221256 A1 Dec. 4, 2003

(51) Int. Cl.$^7$ .............................................. A47G 9/06
(52) U.S. Cl. ................. 5/420; 5/417; 5/740; 5/698; 5/722
(58) Field of Search ............................ 5/420, 417, 722, 5/740, 698; 441/125, 127, 129

(56) References Cited

U.S. PATENT DOCUMENTS

| | | | | |
|---|---|---|---|---|
| 2,853,399 A | * | 9/1958 | Shoults | 428/55 |
| 4,316,298 A | * | 2/1982 | Russo et al. | 5/722 |
| 4,662,851 A | * | 5/1987 | Foster | 441/129 |
| 4,868,940 A | * | 9/1989 | Masadi | 5/417 |
| 5,051,293 A | * | 9/1991 | Breitscheidel et al. | 428/157 |
| 5,312,678 A | * | 5/1994 | McCullough, Jr. et al. | 442/189 |
| 5,491,851 A | * | 2/1996 | Alonso | 5/722 |
| 6,062,930 A | * | 5/2000 | Smith | 441/129 |
| 6,568,310 B2 | * | 5/2003 | Morgan | 89/36.02 |
| 2002/0195030 A1 | * | 12/2002 | Christiansen et al. | 109/49.5 |

* cited by examiner

*Primary Examiner*—Michael F. Trettel
(74) *Attorney, Agent, or Firm*—Jon M. Dickinson, P.C.; Robert D. Varitz, P.C.

(57) ABSTRACT

A plural-panel articulated (segmented) foldable/unfoldable (in a zigzag fashion) structure which can be unfolded and deployed in the form of a rectangular mat, and which can be folded to form plural other shapes, including a fully-folded shape which takes the form of a stack-cube of panels which is very compact in overall size. Each panel includes a central, anti-projectile barrier structure, and a cushioning foam structure, which offers features and advantages relating to fluid buoyancy, thermal insulation, and cushioning.

18 Claims, 3 Drawing Sheets

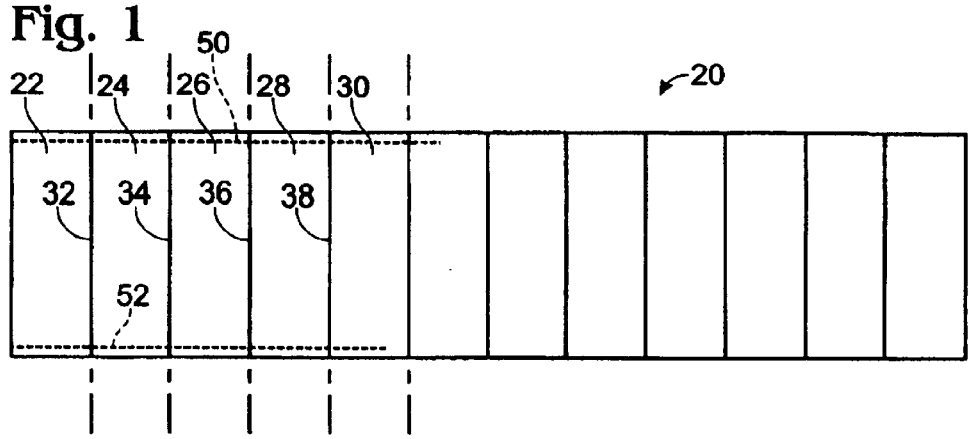
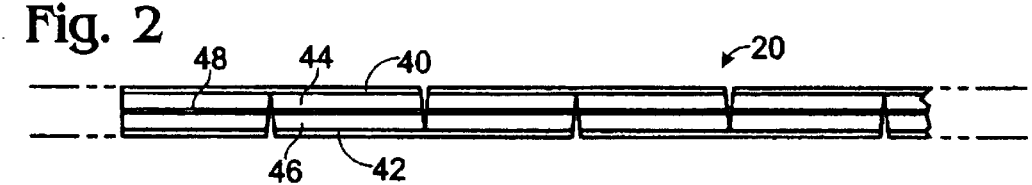
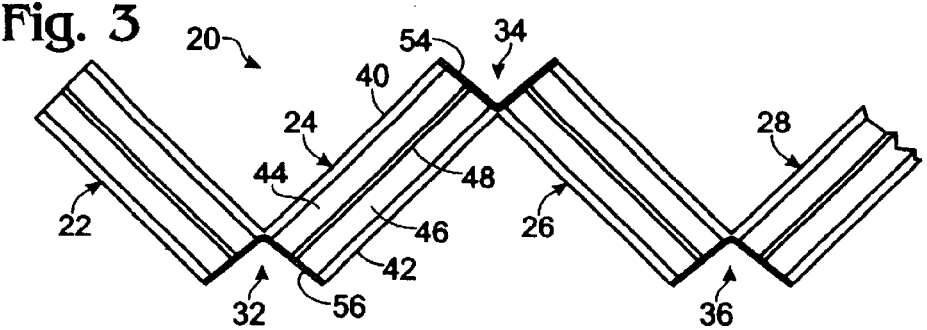
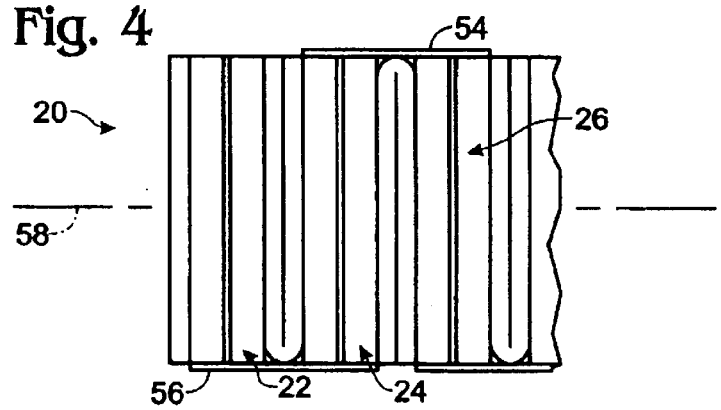

MULTI-PURPOSE, ARTICULATED, SEGMENTED FIELD PANEL KIT AND FABRICATION PROCESS

BACKGROUND AND SUMMARY OF THE INVENTION

The present invention relates to a unique field panel kit which has special utility for military troops, and which features, inter alia, an elongate, multi-purpose, stowable/deployable, articulated, segmented collaboration of hinged-together panels. These panels, or panel segments, can be folded and unfolded to form various structures, such as a generally flat mat, an elongate stack-cube of plural panel segments, and an upstanding, wall-like structure.

The multi-purpose field panel kit of the present invention offers a number of interesting and important features, such as water flotation, thermal insulation, supportive cushioning, and very surprisingly, extremely effective anti-projectile-barriering safety behavior with respect to dangerous projectiles, such as hand-gun bullets, and fragmentary shrapnel components.

The various important features offered by the invention, including those just briefly mentioned, will now become more fully apparent as the description which follows is read in conjunction with the accompanying drawings.

DESCRIPTION OF THE DRAWINGS

FIG. 1 is a developed, plan view of an articulated, hinged panel structure taking the form of an elongate, generally rectangular mat (as pictured in this figure), constructed in accordance with the preferred manner of structuring and practicing the invention.

FIG. 2 is a fragmentary, and somewhat larger-scale, illustration taken generally from the lower side of FIG. 1.

FIG. 3 is a fragmentary view on about the same scale employed in FIG. 2, and which is taken generally from the same perspective as that used in FIG. 2, except that here, the articulated field panel kit structure mat is shown somewhat zigzag (or accordion) folded in the special manner permitted by the structure of the present invention.

FIG. 4 is a fragmentary view, also about the same scale as FIG. 2 illustrating the panelized mat of FIGS. 1, 2 and 3 in a fully folded condition.

Figure 5:
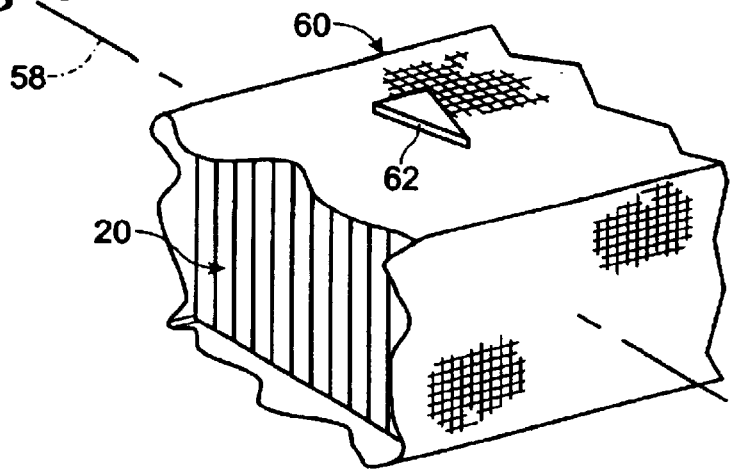
FIG. 5 is a simplified, isometric view showing the fully folded structure of FIG. 4 stowed in an appropriate, form-fitting stowing and carrying bag in accordance with the invention.

The components pictured in these drawings figures are not illustrated to scale.

DETAILED DESCRIPTION OF THE INVENTION

Turning now to the drawings, and referring first of all to FIGS. 1–5, inclusive, indicated generally at 20 is a multi-purpose, articulated, segmented, foldable/unfoldable field panel mat which forms a part of the kit proposed by the present invention. Mat 20, deployed as shown in FIG. 1, could be used, for example, as a cushioning, thermally-insulative, moisture-barrier sleeping mat. It could also be employed as a seating cushion.

While different specific dimensions can be employed, and different numbers of panel components also employed, mat 20 is made up herein of twelve similar panels, or panel segments, such as those five shown at 22, 24, 26, 28, 30. These five representative panel segments are effectively edge-to-edge joined to one another through flexible living fabric hinges, such as the four hinges shown at 32, 34, 36, 38. Hinge 32 operates between panels 22, 24, hinge 34 between panels 24, 26, hinge 36 between panels 26, 28, and hinge 38 between panels 28, 30. These hinges are also referred to herein as stow-enabling structure.

With regard to these several hinges, it will be observed that their respective hinge axes, which are generally illustrated by the respectively associated dash-dot lines that appear in FIG. 1, are spaced apart and generally parallel to one another, and lie, generally speaking, in the planes of the opposite broad faces, or expanses of mat 20. This can be clearly seen in FIG. 2 relative to the two, horizontal parallel, dashed-double-dot lines presented there. Thus, adjacent hinges as seen to lie effectively alternately, and substantially in, the respective spaced planes of the opposite-side, broad facial expanses of the mat.

Each of the twelve panels pictured in mat 20 has a perimeter outline which is about 24-inches long and about 6-inches wide. Further, each panel segment has a depth, or thickness (see particularly FIG. 2), of about ½-inches. These dimensions are purely a matter of choice, but the specifically mentioned dimensions herein have been chosen for illustration purposes, inasmuch as they define a segmented, panelized field kit structure mat which is very convenient for use by military troops.

Each of the panels in mat 20 herein essentially has a structure which is like that of each other panel. Accordingly, and describing, as an illustration, the structure of panel 24, this panel includes two outer-skin fabric layers 40, 42 which are appropriately bonded, as by a suitable contact adhesive or by heat bonding, to the outwardly facing broad expanses of two, internal, closed-cell foam layers 44, 46, respectively. Fabric layers 40, 42 are formed herein preferably of a nylon material, such as 200 Denier Pack Cloth Nylon, and each of layers 44, 46 is preferably formed of a suitable ¼-inches thick, closed-cell, cross-linked polyethylene foam (a material drawn from the polyolefin "family" of materials). These foam layers, also called herein cushioning layers, preferably have a thermal rating of R3 per 1-inch, and have a flotation capability, that is a fluid-buoyancy or water-flotation capability, whereby the overall structure of mat 20, with twelve linked panels each having the panel structure now being described, is entirely capable of floating the "average" human being weighing about 170-lbs. While the particular foam material herein chosen is a cross-linked material, non-cross-linked polyethylene foam material can also be used.

Also included in panel 24, and thus in each of the other panels herein, is a central, anti-projectile, safety barrier fabric layer 48 which is preferably formed of an 18-sublayer, DuPont® number 706, Kevlar® material. Layer 48 is also referred to herein as a barrier-layer structure.

All of these several sandwiched layers, or layer components, five in all in each panel in the panels in mat 20 now being described, are suitably bonded to one another, as by a heat-based laminating process, or by use of a suitable contact adhesive.

Further aiding in uniting all of the layers within each panel, such as within panel 24, are rows of nylon-thread stitching, such as the two rows shown in panel 24 at 50, 52. These stitching rows extend along the short edges of the panel, bridging between hinges 32, 34.

Looking now particularly at FIGS. 3 and 4, here what can be seen, in relation to each hinge region, is an additional piece of structure in mat 20 which takes the form of an elongate and flexible, polyethylene strip, such as the two strips shown at 54, 56 which extend along the long lateral edges of panel 24. As can be seen, these strips which are appropriately heat bonded into place, join these edges of panel 24 with the neighboring edges of panels 22, 26, respectively, essentially along the lengths of hinges 32, 34 respectively. Such strips serve to provide added strength to the fabric-based living hinges previously mentioned which exist between adjacent panels.

The overall weight of mat 20 herein is about 2-lbs. As can be seen, and as has been mentioned, in FIGS. 1 and 2 mat 20 is pictured in a flattened or developed condition wherein its several panels, relative to the interconnecting hinges, have essentially been fully unfolded according to the invention. From this unfolded state, the hinges between adjacent panels allow this panel-segmented structure to be folded up very compactly for stowage or other deployment, with such folding taking place in what can be thought of as a zigzag or accordion-type manner, such as is pictured clearly in FIG. 3.

In FIG. 4, all of the panel segments in previously described mat 20 have been fully folded and brought together into a relatively tight, elongate, cube-like stack (also referred to herein as a stack-cube) in accordance with the invention. It is with respect to such a stack that the now substantially parallel-planar, but slightly spaced, panels, in relation to their respective, internal, anti-projectile barrier layers, define what is referred to herein as a ballistic barrier axis. This axis is shown by dashed-dot line 58 in FIGS. 4 and 5. Axis 58 lies essentially normal to the respective, and now generally parallel, planes of the several panel-internal barrier layers which are present in the stacked and folded panels.

In this fully folded condition of the articulated, panelized mat structure of this invention, a soldier, employing this invention, can rest the folded structure on the ground with a disposition very much like that which is shown in FIG. 5, and, with this folder structure constrained preferably inside its carrier bag (see particularly FIG. 5) still to be described hereinbelow, can use the upper region of the folded panel structure as a weapon rest, with the folded structure itself providing a low, horizontal, anti-ballistic barrier. This barrier is substantially fully capable of stopping the travel of many kinds of dangerous projectiles, such as a bullet from a hand gun, like a 9-mm handgun, or a fragmentary shrapnel piece, such as from a handgrenade.

In FIG. 5, this folded panel-structure arrangement of the present invention is shown stowed conveniently within a transporting bag 60, which is shaped, conveniently, and quite precisely (form-fittingly) to receive the folded structure in a matching, shaped confining space. In FIG. 5, the near end of bag 60 is shown open simply to illustrate the particular stacked and parallel-planer orientations presented there for the respective, folded, segmented panels.

Preferably, and now mentioning another feature of the invention, bag 60 is equipped with visual and tactile indicator structure, such as that generally represented at 62 in FIG. 5. This indicator structure can give to soldier a clear indication, even in very dark conditions, of the specific orientation of the stacked panels within the bag, thus to give important information about the orientation of the anti-projectile safety barrier axis. It is, of course, entirely possible that simply by reaching into the open end of the enclosure bag to make contact with the stacked and folded panel structure, a soldier can know immediately the direction of the mentioned barrier axis.

Other configurations and potential deployments, of the very many which can be assumed and offered by the structure of the present invention, in addition to what is shown and has been discussed so far, are illustrated very schematically and simply in FIGS. 6–10, respectively.

Figure 6:
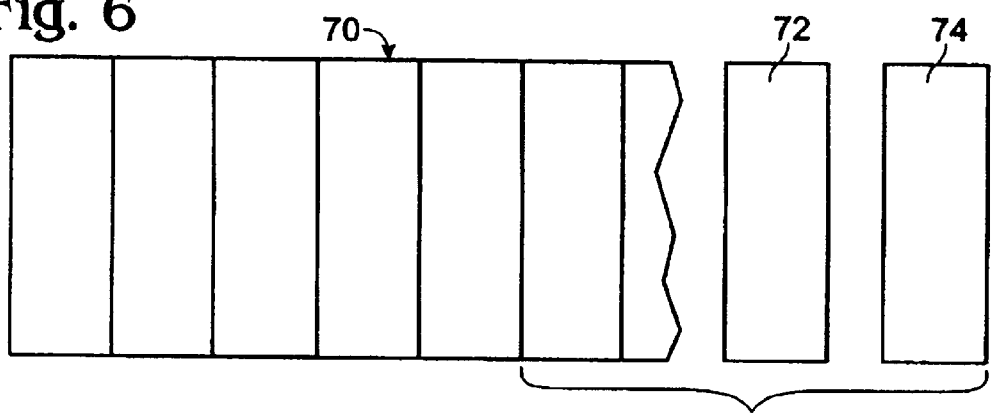
FIG. 6 is a view much like that presented in FIG. 1, but here showing a modified field panel kit which includes, in addition to the plural-panel mat structure pictured in FIG. 1, two additional, individualized, singularized panels, each of which, in internal construction, is like each of the hinged-together panels shown in the structure of FIG. 1.

In FIG. 6, a modified form of kit is illustrated (without the storage bag also being shown here) which includes a mat 70 that is like previously mentioned mat 20, and in addition, two separate and free panels 72, 74, each of which essentially has the same internal structure as does previously described panel 24.

Figure 7:
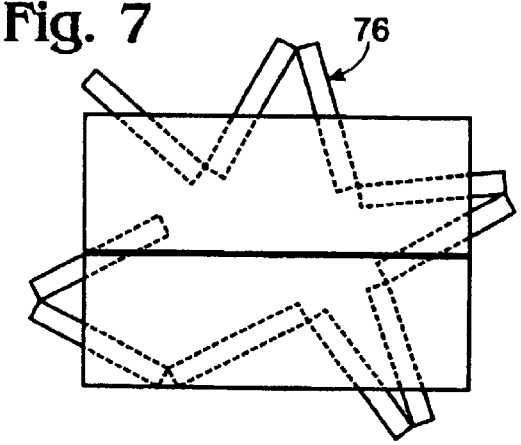
FIG. 7 is a view illustrating how componentry constructed in accordance with the present invention can be employed to set up a functional field table.

FIG. 7 provides a simplified plan view which illustrates at 76 employment of a kit like that pictured in FIG. 6, wherein the mat in the kit is zigzag folded and stood on edge, with the two free panels perched side-by-side on top of this edge-supported mat to form what can be thought of as a kind of field table.

Figure 8:
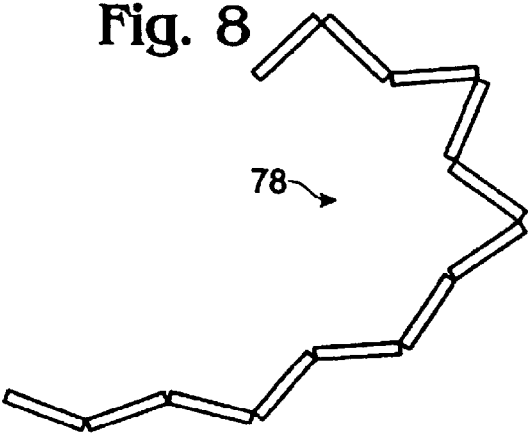
FIG. 8 is a simplified top plan view showing how an articulated mat-like structure formed in accordance with the present invention can be deployed to provide a low-height, screened and shielded area, say, on the ground.

FIG. 8 illustrates at 78 deployment of the articulated mat of this invention whereby it is stood on edge in a kind of semi-circular fashion to provide a low-level wall, screen, shield, or shelter.

Figure 9:
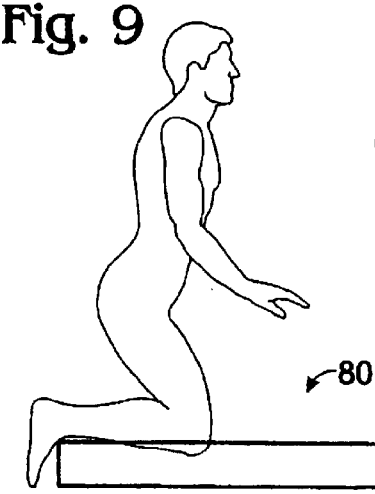
FIG. 9 is a very simplified side elevation picturing a single panel made in accordance with the present invention employed as a cushioning, kneeling mat on the ground.

FIG. 9 illustrates at 80, in very simplified form, use of a single panel as a cushioning, kneeling mat.

Figure 10:
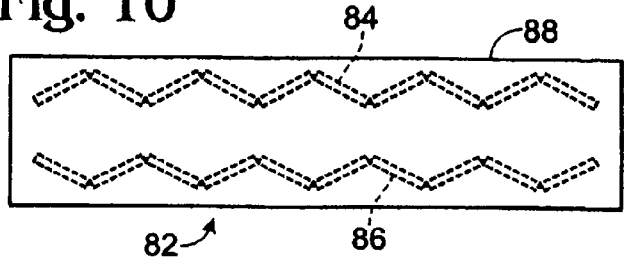
FIG. 10 presents a simplified top plan view showing how three, elongate, articulated, panelized mats made in accordance with the invention can be arranged to form a low, long table.

FIG. 10 illustrates at 82 how components from several kits made in accordance with the invention can be deployed utilizing plural mat components to create an elongate table, which table, as illustrated herein, consists of two, on-edge, zigzag-deployed, panelized mats 84, 86 which support a single, overhead mat 88.

Figure 11:
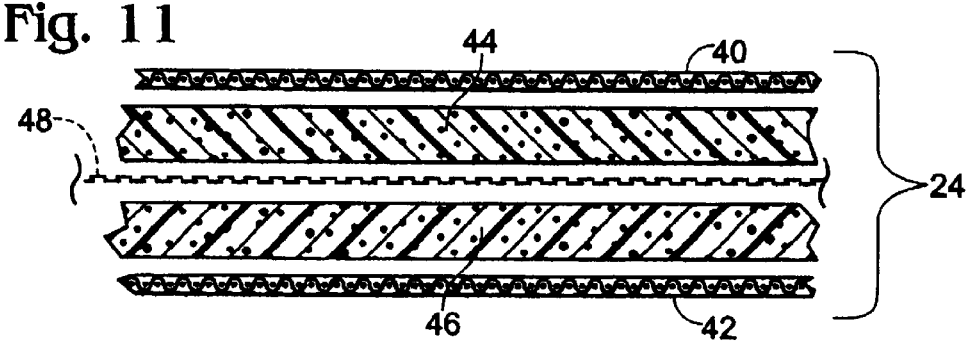
FIGS. 11 and 12 collectively illustrate methodology involved in the construction of the articulated mat component of the present invention.
Figure 12:
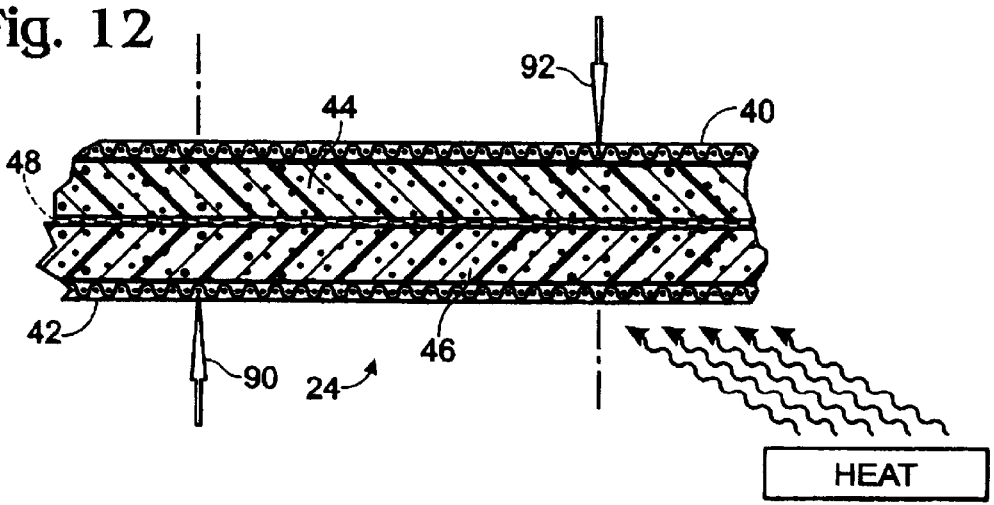

FIGS. 11 and 12 illustrate the preferred process or method by way of which the articulated plural-panel structure described above may be made. FIG. 11 shows the five layer-like structures which make up each panel, with these layer components being pictured in a somewhat vertically exploded manner. The building process now tobe described is presented with the various, respective panel layers bearing the same respective numbers employed above in the description of panel 24, and with formation of associated living hinges described in the context of previously discussed hinges 32, 34.

What is first performed is an assembly and lamination of the two foam layers, 44 and 46, with the associated outer surface-bonded, fabric skins 40 and 42, respectively. Lamination is performed employing either a hear-bonding technique, or an appropriate surface-distributed contact adhesive. The resulting laminated components are referred to herein as outer layer subassemblies.

Next, the plural-layer barrier layer structure 48 is internally laminated to the inwardly facing faces (or expanses) of the cushioning foam components of the structures assembled during the first laminating procedure just mentioned above. Lamination here is performed preferably in one of the manners just mentioned above.

Preferably, all of this activity takes place with respect to large enough expanses of all of the five components pictured in FIG. 11 whereby an entire, final, articulated mat, such as mat 20, can be formed directly. One way of doing this, of course, is to give each one of the five components pictured in exploded form in FIG. 11 a perimetral footprint which coincides with the final desired perimetral dimensions of the fully completed articulated mat.

Next, and as is illustrated in FIG. 12, suitable oppositely directed and laterally spaced, or staggered, knifelike incisors (tools) are driven, as indicated by large knifelike arrows 90, 92 in FIG. 14, transversely into the overall laminated structure, and along long, straight lines which are parallel to one another and spaced apart by about 6-inches. This incising activity produces, effectively, a plurality of opposite-side-staggered, spaced and parallel deep cuts which penetrate all but the outer skin fabric layer which is on the opposite side of the assembly from the location where the respective incisors are employed.

As a consequence, what exists after incising is a fully articulated, living-hinged, plural-panel arrangement like that which has been described above. The incisions made by tools 90, 92 in FIG. 14 result specifically in the creation of previously mentioned living hinges 32, 34, respectively Next, in any appropriate order, edge-finishing, hinge-aiding strips, such as previously mentioned strips 54, 56 are heat-adhered to the adjacent edges of the now-divided panel segments, and immediately adjacent each of the hinges, thus to provide appropriate edge finishing and strengthening of the several hinge structures between the now-articulated, plural panel segments. Finally, stitching, such as that which has been described earlier, is performed.

The invention thus provides a unique, panelized field kit suitable especially for use by military troops, and offering a multiplicity of functionalities, many of which have been specifically mentioned above. The overall structure is extremely light in weight, namely about 2-pounds, and can easily be carried, and very compactly so, as an additional piece of equipment for and by a soldier.

It should be apparent that a very versatile field panel kit is offered by the present invention. The sizes of the various, mentioned layer components can easily be changed to suit different application, and the overall number of layer components can also be varied.

Accordingly, while preferred embodiments, and manners of deploying, using and fabricating the structure, of the present invention have been described and illustrated herein, it is appreciated that other variations and modifications may be made without departing from the spirit of the invention.

We claim:

1. A multi-purpose, articulated, segmented, foldable/unfoldable, field panel kit comprising plural, generally planar panel segments, each having a nominal plane and formed as a plural-layer structure including a ballistic, barrier-layer structure, with each segment having opposite edges, and with the collection of segments organized generally into edge-to-edge, confronting adjacency, and plural hinge structures each operatively interposed and interconnecting adjacent, confronting edges in adjacent panel segments, said hinge structures accommodating swinging of different pairs of edge-connected segments about different common hinge axes each of which lies generally to one side adjacent, and substantially parallel to, the nominal plane of an edge-connected segment, with next-adjacent hinge structures for said collection of segments defining respective hinge axes which lie on opposite sides of the nominal plane of the panel segment bracketed by said next-adjacent structures.

2. The kit of claim 1, wherein said barrier-layer structure includes plural, adjacent, ballistic barrier layers.

3. The kit of claim 1, wherein said barrier-layer structure is sandwiched between a pair of compressible cushioning layers.

4. The kit of claim 3, wherein said cushioning layers possess nominally outwardly facing surfaces, and said segments further include skin layers which are disposed as overliers on said surfaces.

5. The kit of claim 1, wherein said panel segments have generally rectangular outlines.

6. The kit of claim 5 wherein, when said panel segments are fully unfolded, the collaborative organization of these panel segments is deployable as an elongate, generally rectangular, flat mat.

7. The kit of claim 5, wherein said hinge structures accommodate generally zigzag, accordion-like folding and unfolding of said panel structures.

8. The kit of claim 7 wherein, the panel segments are (a) when said panel segments are fully folded, these segments collectively take the form of a generally rectilinear, elongate stack-cube, (b) when the panel segments are partially unfolded, the panel segments can take the form of a long-edge-supported, free-standing, upright, wall-like structure, and (c) when the panel segments are fully unfolded, the panel segments are deployable as an elongate, generally rectangular, flat mat.

9. The kit of claim 8, wherein the panel segments, when fully folded into the form of a stack-cube, organize said barrier-layer structures collectively to form an array of spaced, generally parallel-planar expanses that cooperatively define a ballistic barrier axis which is normal to planes of said expanses.

10. The kit of claim 9 which further includes a generally form-fitting bag for receiving the panel segments in the kit in a defined, relative-disposition manner under circumstances with the panel structures in its fully folded condition, and wherein said bag is furnished with appropriate indicators to identify the directionality of said ballistic barrier axis.

11. The kit of claim 10, wherein said indicators include at least one of (a) visual indicators, and (b) tactile indicators.

12. The kit of claim of 1, wherein said panel segments are formed, at least partially, of a thermally insulating material.

13. The kit of claim of 12, wherein said insulating material takes the form of a polyethylene foam.

14. The kit of claim of 1, wherein said panel segments are formed, at least partially, of a fluid-buoyancy material.

15. The kit of claim 14, said fluid-buoyancy material takes the form of a polyethylene foam.

16. The kit of claim 1, wherein each panel segment includes a foam cushioning layer disposed adjacent said ballistic barrier-layer structure.

17. A multi-purpose, stowable/deployable, field panel kit comprising plural, interconnected, generally planar panel segments, each including a generally planar, ballistic barrier expanse, and stow-enabling structure operatively interconnecting said segments in relative-motion-allowing adjacency with respect to one another, and accommodating, with stowing of the panel structures in the kit, spaced generally planar-expanse adjacency of plural ones of said barrier expanses, thus to define a plural-expanse, ballistic barrier axis which intersects the planes of said barrier expanses.

18. A method of making a multi-purpose, stowable-deployable articulated and segmented field panel kit comprising creating first and second outer layer subassemblies, each including a cushioning foam layer, and a fabric overlayer on one side only of each such foam layer, placing the first and second subassemblies with their foam-layer constituents disposed on opposite sides of a ballistic barrier-layer structure, at appropriate times, during the two first above-mentioned steps, performing appropriate bonding lamination between adjacent confronting layers and the barrier-layer structure, and thereafter, in the overall structure resulting from lamination, producing incisions along plural, spaced, substantially parallel lines, with adjacent incisions extending downwardly into and from opposite sides of the overall laminated structure so-as-to produce incisions each having a depth which is just short of the full thickness of the laminated layer structure, thus to form plural, spaced, generally parallel, elongate living hinges which effectively lie, in an alternating way, on opposite broad sides of the overall assembly.

\* \* \* \* \*